United States Patent
Saether et al.

(10) Patent No.: US 10,902,436 B2
(45) Date of Patent: Jan. 26, 2021

(54) FRAUD DETECTION SYSTEM AND METHOD

(71) Applicant: TOMRA SYSTEMS ASA, Asker (NO)

(72) Inventors: Geir Saether, Asker (NO); Ronald Sivertsen, Vettre (NO); Tom Lunde, Blommenholm (NO); Johnny Njåstad, Oslo (NO)

(73) Assignee: TOMRA SYSTEMS ASA, Asker (NO)

( * ) Notice: Subject to any disclaimer, the term of this patent is extended or adjusted under 35 U.S.C. 154(b) by 263 days.

(21) Appl. No.: 15/765,280

(22) PCT Filed: Oct. 5, 2016

(86) PCT No.: PCT/EP2016/073775
§ 371 (c)(1),
(2) Date: Apr. 2, 2018

(87) PCT Pub. No.: WO2017/060288
PCT Pub. Date: Apr. 13, 2017

(65) Prior Publication Data
US 2018/0232745 A1  Aug. 16, 2018

(30) Foreign Application Priority Data

Oct. 6, 2015 (EP) .................................. 15188634

(51) Int. Cl.
*G06Q 30/00* (2012.01)
*G06N 20/00* (2019.01)
(Continued)

(52) U.S. Cl.
CPC ......... *G06Q 30/0185* (2013.01); *B30B 9/321* (2013.01); *B30B 15/0094* (2013.01);
(Continued)

(58) Field of Classification Search
None
See application file for complete search history.

(56) References Cited

U.S. PATENT DOCUMENTS 4,463,844 A * 8/1984 Huffman ................. B30B 9/321
100/902
4,579,216 A * 4/1986 DeWoolfson ......... G07F 7/0609
100/902

(Continued)

FOREIGN PATENT DOCUMENTS

| EP | 2 447 020 A1 | 5/2012 |
|---|---|---|
| EP | 2 538 394 A1 | 12/2012 |
| WO | 00/63853 A1 | 10/2000 |

OTHER PUBLICATIONS

Office Action (Notice of Reason(s) for Rejection) dated Nov. 22, 2019, by the Japanese Patent Office in corresponding Japanese Patent Application No. 2018-514280, and an English Translation of the Office Action. (6 pages).

(Continued)

*Primary Examiner* — Dennis W Ruhl
(74) *Attorney, Agent, or Firm* — Buchanan Ingersoll & Rooney P.C.

(57) ABSTRACT

A fraud detection system for a reverse vending machine, the system including: a detector adapted to detect at least one container entered into the reverse vending machine; a compactor load sensor adapted to measure load of a compactor of the reverse vending machine during operation, wherein the compactor is adapted to compact entered containers downstream of said detector; and a compactor load sensor monitoring device configured to determine whether the detected at least one container is compacted as expected based on the load measured by the compactor load sensor.

23 Claims, 9 Drawing Sheets

(51) Int. Cl.
  *G06Q 20/40* (2012.01)
  *B30B 9/32* (2006.01)
  *B30B 15/00* (2006.01)
  *G07F 7/06* (2006.01)
  *G06K 7/14* (2006.01)

(52) U.S. Cl.
  CPC ........... *G06K 7/1413* (2013.01); *G06N 20/00* (2019.01); *G06Q 20/4016* (2013.01); *G07F 7/0609* (2013.01)

(56) References Cited

U.S. PATENT DOCUMENTS

| | | | |
|---|---|---|---|
| 6,571,695 B1* | 6/2003 | Holmen | B26F 1/24 |
| | | | 100/155 R |
| 2003/0010597 A1* | 1/2003 | Kiva | B07C 5/3412 |
| | | | 194/208 |
| 2008/0041996 A1* | 2/2008 | Shaw | B02C 19/0081 |
| | | | 241/236 |
| 2008/0296374 A1 | 12/2008 | Gonen et al. | |
| 2012/0173014 A1 | 7/2012 | Morishita et al. | |
| 2014/0125490 A1* | 5/2014 | Ullrich | B30B 9/321 |
| | | | 340/870.01 |
| 2015/0307273 A1 | 10/2015 | Lyman | |

OTHER PUBLICATIONS

International Search Report (PCT/ISA/210) dated Dec. 6, 2016, by the European Patent Office as the International Searching Authority for International Application No. PCT/EP2016/073775.
Written Opinion (PCT/ISA/237) dated Dec. 6, 2016, by the European Patent Office as the International Searching Authority for International Application No. PCT/EP2016/073775.

\* cited by examiner

FRAUD DETECTION SYSTEM AND METHOD

TECHNICAL FIELD OF THE INVENTION

The present invention relates to a fraud detection system and method for reverse vending machines. The present invention also relates to a reverse vending machine comprising such a fraud detection system, and to a computer program product.

BACKGROUND

There are known examples where monetary fraud has been taking place using Reverse Vending Systems (RVS). A main contributor to this fraud is based on someone removing refund-eligible Used Beverage Containers (UBCs) from the system before they are compacted and devaluated or replacing UBCs with worthless objects prior to compaction.

SUMMARY OF THE INVENTION

It is an object of the invention to provide an anti-fraud system and method that may hinder the above-mentioned fraudulent behaviour.

According to a first aspect of the invention, there is provided a fraud detection system for a reverse vending machine, the system comprising: a detector adapted to detect at least one container entered into the reverse vending machine; a compactor load sensor adapted to measure load of a compactor of the reverse vending machine during operation, wherein the compactor is adapted to compact entered containers downstream of said detector; and a compactor load sensor monitoring device configured to determine whether the detected at least one container is compacted as expected based on the load measured by the compactor load sensor.

The present invention is based on the understanding that the load measured by a compactor load sensor may be used to determine whether one or more detected containers are compacted as expected. If they are not compacted as expected, then the reverse vending machine may be subject to a fraud attempt. The present system may be construed as an apparatus.

It should be noted that EP2447020 A1 discloses a controlling system which i.a. comprises an evaluation device provided for determining a compacting process from a measured phase difference. However, EP2447020 A1 does not disclose that the determined compacting process is used to determine whether any detected containers also are compacted.

To determine whether or not an individual container is compacted as expected, the compactor load sensor monitoring device may be configured to compare the measured load of the compactor with an expected load (of the compactor) for the individual container. A mismatch between measured and expected load may for example be due to the fact that the container is removed from the reverse vending machine after it is detected by the detector but before it is compacted, or that the container which is detected differs from the container or item that is compacted. The expected load may for example be a threshold value, a compactor load signature, an accumulated load, etc. Furthermore, the expected load may be expected to occur within a predetermined time range following detection of the container by the detector. The start and/or duration of said time range may for example depend on the layout of the reverse vending machine.

The compactor load sensor monitoring device may be configured to determine the total number of compacted containers for a session of the reverse vending machine. The compactor load sensor monitoring device may further be configured to calculate a change in fraud factor based on the number of compacted containers and a number of containers detected by the detector for said session. For example, if the number of containers detected by the detector is larger than the number of compacted containers, then the fraud factor may be increased. In this way, the present system may not only check individual containers, but it can also detect fraud over time. A trigger signal may be issued if the fraud factor exceeds a threshold. The trigger signal may for example trigger an alarm or shut-down of the reverse vending machine, or inhibit crediting of the refund value. Alternatively or complementary, the derivative of the fraud factor may be monitored, to rapidly detect fraud. Furthermore, the compactor load sensor monitoring device may be configured to increase the fraud factor with a greater amount for each container which is not compacted as expected and to decrease the fraud factor with a smaller amount for each container that is compacted as expected. That is, for every container that is not compacted as anticipated, several containers have to be properly compacted not to raise the fraud factor over a session. This also means that the fraud factor may be kept in equilibrium even if not all containers are accounted for. This may compensate for any misreading by the compactor load sensor.

To determine whether a plurality of detected containers are compacted as expected, the compactor load sensor monitoring device may be configured to accumulate the load measured by the compactor load sensor for a session of the reverse vending machine. Furthermore, the detector may detect what containers that are entered into the reverse vending machine, and based on predetermined or learned compactor loads for the various containers, an expected accumulated load may be determined. The compactor load sensor monitoring device may then compare the accumulated load with the expected accumulated load. If the loads do not match, there may be a fraud attempt.

Said detector may be selected from a group comprising: a barcode reader, a security mark reader, a shape sensor, and a material sensor, or combinations thereof (e.g. the system may comprise both a barcode reader and a security mark reader). The detector may be arranged in conjunction with a recognition chamber of the reverse vending machine.

The system may further comprise a transport surveillance sensor arranged downstream of said detector and upstream of said compactor load sensor. The transport surveillance sensor may be arranged in conjunction with a conveyor or sorter unit of the reverse vending machine.

A refund signal may be issued only if each of the detector, the transport surveillance sensor, and the compactor load sensor has indicated proper handling of the container. In this way, the container has to pass at least three "checkpoints" before it is "approved", i.e. before a refund is paid out for the container.

The compactor load sensor monitoring device may be configured to analyse a compactor load profile of the load measured by the compactor load sensor in order to classify the at least one container. Each container may for example be classified according to type of container (plastic bottle, aluminium can, class bottle, etc.) and/or according to orientation (bottom first, sideways, arbitrary way, etc.). Any unclassified container may increase the aforementioned fraud factor. Furthermore, the compactor load sensor monitoring device may be configured to record compactor load profiles for various containers, wherein the system further comprises machine learning software configured to train the system based on the recorded compactor load profiles. Specifically, the machine learning software may replace old compactor load profiles with newly recorded profiles. In this way, the system can adapt to changing compactor load profiles being caused by compactor wear and tear.

The detector may be adapted to send further information about the at least one detected container to the compactor load sensor monitoring device. The further information may for example include size, weight, material type, etc. This may improve the system's ability to determine what is being compacted.

To measure the compactor load using slip measurement, said compactor load sensor may include a tacho sensor in a power train of the compactor. Such a sensor is relatively simple per se. In other embodiments, said sensor may be selected from a group comprising: a torque transducer, a load cell mounted in the power train of the compactor, a frequency inverter, a power gauge, and a slip sensor.

The system may further comprise a second compactor and a second compactor load sensor adapted to measure load of the second compactor during operation. The system may comprise additional compactors and compactor load sensors.

The compactor load sensor monitoring device may be configured to determine an expected compaction time window for a container of the at least one container based on the moment the container is detected by the detector.

The compactor load sensor monitoring device may be configured to construct a compaction event including the expected compaction time window for at least one container and corresponding load data representative of the load of the compactor measured by the compactor load sensor.

The system may further comprise communication means adapted to send constructed compactions events to a remote device.

The compactor load sensor monitoring device (being configured to determine whether the detected at least one container is compacted as expected) may be configured to determine that the container is not compacted as expected if the measured load in the expected compaction time window does not exceed a predetermined value. This is a relatively "easy" way to detect fraud, and it may be useful in particular if no database with container empty weights is available.

The compactor load sensor monitoring device may be configured to normalize the measured load for the at least one container, and to calculate a moving average based on the normalized measured load for said at least one container and normalized measured load for one or more previous containers. By normalizing the measured load, there is no need to know expected loads for different sizes and/or types of containers.

The compactor load sensor monitoring device (being configured to determine whether the detected at least one container is compacted as expected) may be configured to determine that containers are compacted as expected if the calculated moving average matches an expected, predetermined average. In this way it is possible to detect if containers are replaced by other items between the detector and the compactor.

The compactor load sensor monitoring device may be configured to normalize the measured load for the at least one container by dividing it with the empty weight of the at least one container.

According to a second aspect of the invention, there is provided a reverse vending machine comprising a fraud detection system according to the first aspect. This aspect may exhibit the same or similar features and technical effects as the previous aspect.

According to a third aspect of the invention, there is provided a fraud detection method in a reverse vending machine, which method comprises: detecting at least one container entered into the reverse vending machine; measuring load of a compactor intended to compact entered containers; and determining whether the detected at least one container is compacted as expected based on the load measured by the compactor load sensor. This aspect may exhibit the same or similar features and technical effects as the previous aspects, and vice versa.

According to a forth aspect of the invention, there is provided a computer program product comprising code for performing, when run on a computer device, the step(s) of: determining whether at least one container detected by a detector of a reverse vending machine is compacted as expected, by a compactor positioned downstream of the detector, based on a load of the compactor measured by a compactor load sensor. This aspect may exhibit the same or similar features and technical effects as the previous aspects, and vice versa. The computer device may for example be the aforementioned compactor load sensor monitoring device.

According to another aspect, there is provided a fraud detection system for a reverse vending machine, the system comprising: a detector adapted to detect a container entered into the reverse vending machine; a sensor for measuring a characteristic of a part of the reverse vending machine as the container is being processed; a device configured to compare the measured characteristic with a predetermined characteristic value based on the type of container. This aspect is based on the concept of using an operational characteristic of an element of a reverse vending machine to create a characteristic profile related to a particular type of container being processed by the machine and using any mismatch between an expected characteristic profile and an actual measured operational characteristic to detect a potential fraud and/or a processing error. The part of the reverse vending machine being measured may be a compactor adapted to compact the entered container downstream of said detector and the characteristic may be the load of the compactor during the operation of compacting a container. The system may comprise a compactor load sensor adapted to measure load of the compactor during operation; and a compactor load sensor monitoring device configured to compare the load measured by the compactor load sensor with an expected load of the compactor, wherein the expected load is based on the detected container.

BRIEF DESCRIPTION OF THE DRAWING

These and other aspects of the present invention will now be described in more detail, with reference to the appended drawings showing currently preferred embodiments of the invention.

DETAILED DESCRIPTION

Figure 1:
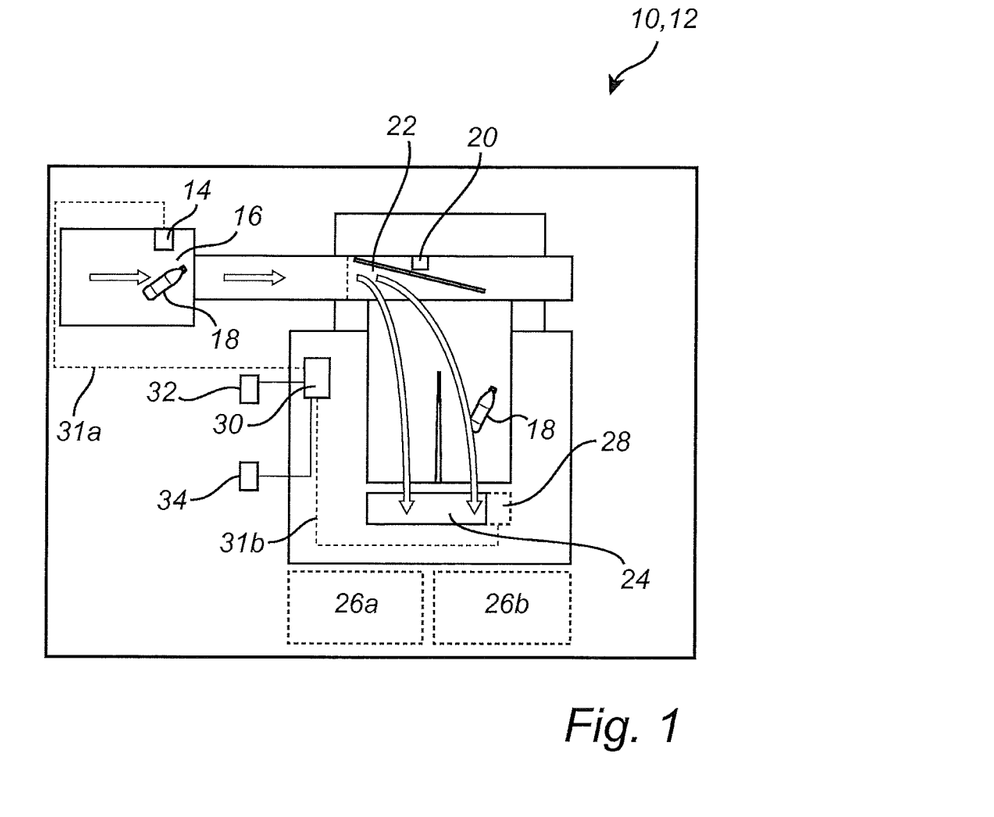
FIG. 1 schematically illustrates a reverse vending machine comprising a fraud detection system according to an embodiment of the present invention.

FIG. 1 shows a fraud detection system 10 incorporated in a reverse vending machine 12. The reverse vending machine 12 may have a front end unit and a backroom unit, or it can be an integrated machine wherein all functionality is integrated in one unit. The overall function of the reverse vending machine 12 may be to automatically collect, sort, and handle the return of used beverage containers for recycling or reuse.

The fraud detection system 10 comprises a detector 14. The detector 14 may be arranged in conjunction with a recognition chamber 16 of the reverse vending machine 12. The detector 14 is adapted to detect containers 18 entered into the reverse vending machine 12. The detector 14 may be a conventional barcode and/or security mark reader, or a shape or material sensor. The detector may further be adapted to send out information about the container 18, such as size, weight, material type, expected compactor load, etc.

The system 10 may further comprise a transport surveillance sensor 20. The transport surveillance sensor 20 is arranged downstream of the detector 14. The transport surveillance sensor 20 may be arranged in conjunction with a conveyor or sorter unit 22 of the reverse vending machine 12. The conveyor or sorter unit 22 is generally adapted to transport the container 18 to a compactor 24 of the reverse vending machine 12. The compactor 24 is intended to compact containers 18. In the embodiment shown in FIG. 1, the reverse vending machine 12 has two destinations 26a and 26b, for example one for (compacted) plastic bottles and one for (compacted) aluminium cans. The conveyor or sorter unit 22 may ensure that the container 18 is transported towards its correct destination. In the example of FIG. 1, the container 18 is transported towards destination 26b.

The system 10 further comprises a compactor load sensor 28. The compactor load sensor 28 is adapted to measure load of the compactor 24 during operation. The load of the compactor 24 may here for example be construed as the compactor's power consumption and/or torque during operation. When a container is compacted, the power consumption or torque, and hence the load, increases. In one embodiment, the compactor load sensor 28 includes a tacho sensor arranged in the power train of the compactor 24. The tacho sensor may for example measure the rpm of the motor's rotor. Using the tacho sensor, the slip of the motor may be measured, wherein the slip determines the motor's torque, and hence the load of the compactor 24 can be measured. In other embodiments, the compactor load sensor 28 may be a torque transducer, a load cell mounted in the motor of the compactor 24, a frequency inverter, a power gauge, or another slip sensor, for example.

The system 10 further comprises a compactor load sensor monitoring device 30. The compactor load sensor monitoring device 30 may be a separate device, or it may be integrated with the main computer or control system of the reverse vending machine 12. The compactor load sensor monitoring device 30 is connected to at least the detector 14 and the compactor load sensor 28 via connections 31a, 31b.

The connections 31a, 31b may be wired or wireless. The compactor load sensor monitoring device 30 is generally configured to determine whether at least one detected container 18 is compacted as expected based on the load measured by the compactor load sensor 28.

For an individual container 18, the compactor load sensor monitoring device 30 may compare the load measured by the compactor load sensor 28 with an expected load of the compactor 24 for the container 18. The expected load may for example be a generic threshold value, a container specific threshold value, a compactor load signature (see below), an accumulated load, etc. The expected load is expected to occur some time after detection of the container by the detector 14, depending on the layout of the reverse vending machine. The time when the expected load is expected to occur may for example be expressed as a range, since the transportation time through the reverse vending machine 12 may differ somewhat from container to container.

Figure 2:
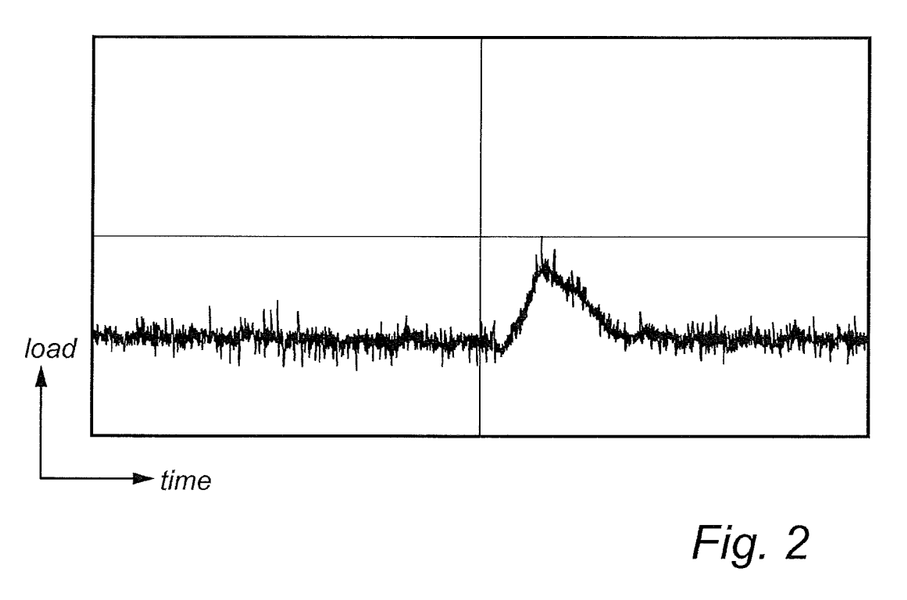
FIG. 2 shows a compactor load profile for an aluminium can.

Furthermore, the compactor load sensor monitoring device 30 may be configured to analyse a compactor load profile of the load measured by the compactor load sensor 28. In this way, the compactor load sensor monitoring device 30 may classify a compacted container 18 based on the analysed compactor load profile. Each container 18 may for example be classified according to type of container (plastic bottle, aluminium can, glass bottle, etc.) and/or according to orientation (bottom first, sideways, arbitrary way, etc.). An example of a compactor load profile or signature for an aluminium can is shown in FIG. 2. Furthermore, the compactor load sensor monitoring device 30 may be configured to record compactor load profiles for various containers. The recorded profiles may for example be stored in a database 32. The database 32 could also include pre-stored compactor load profiles. Furthermore, the system 10 may comprise machine learning software 34 configured to train the system 10 based on the recorded compactor load profiles. Specifically, the machine learning software 34 may replace old compactor load profiles (in the database 32) with newly recorded profiles. In this way, the system 10 can adapt to changing compactor load profiles being caused by wear and tear of the compactor 24 over time.

The compactor load sensor monitoring device 30 may further be configured to calculate a fraud factor. A trigger signal may be issued if the calculated fraud factor exceeds a threshold X. The trigger signal may for example trigger an alarm or shut-down of the reverse vending machine 12. Alternatively or complementary, the derivative of the fraud factor may be used, to rapidly detect fraud. The fraud factor may initially be set to a value below the threshold X.

In one embodiment, the fraud factor is changed based on detection of containers. For each container detected by the detector 14, a signal may be sent to the compactor load sensor monitoring device 30 that a container (UBC) is on its way. The compactor load sensor monitoring device 30 tries to find a compactor load profile in the load measured by the compactor load sensor 28 that matches any of the compactor load profiles stored in the database 32. For each match, and also for each found compactor load profile that does not match a profile in the database 32 (unclassified container), the compactor load sensor monitoring device 30 increments a counter. The fraud factor change may then be calculated based on the counter and a number of containers detected by the detector 14 for a session of the reverse vending machine 12 (session=first to last container entered by a consumer, or a subset of these containers), according to the following exemplifying formula:

change in fraud factor=(|(# of detected containers−# of compacted containers)|*A)−(# of compacted containers*B) wherein (A>B)

If 15 containers are detected by the detector, and a total of 12 containers are compacted (10 classified, 2 unclassified), then the change in fraud factor is (15−12)A−(12)B=3A−12B.

By using the absolute value of the difference between detected and compacted containers, the fraud factor may be increased also if the compactor load sensor monitoring device 30 finds that the number of compacted containers somehow is greater than the number of containers detected by the detector 14. The compactor load sensor monitoring device 30 may for example find two compactor load signatures for a detected container, and thereby increment the counter twice.

In another embodiment, the fraud factor is further changed based on classification of containers. Here, the compactor load sensor monitoring device 30 only counts the found compactor load profiles that match a compactor load profiles in the database 32, i.e. it counts the compacted containers that are classified as valid containers. The change in fraud factor may then be calculated according to the following exemplifying formula:

change in fraud factor=(|(# of detected containers−# of classified containers)|*A)−(# of classified containers*B) wherein (A>B)

Using the above example of 15 detected and 10 classified containers, the change in fraud factor is (15−10)A−(10)B=5A−12B.

Figure 3:
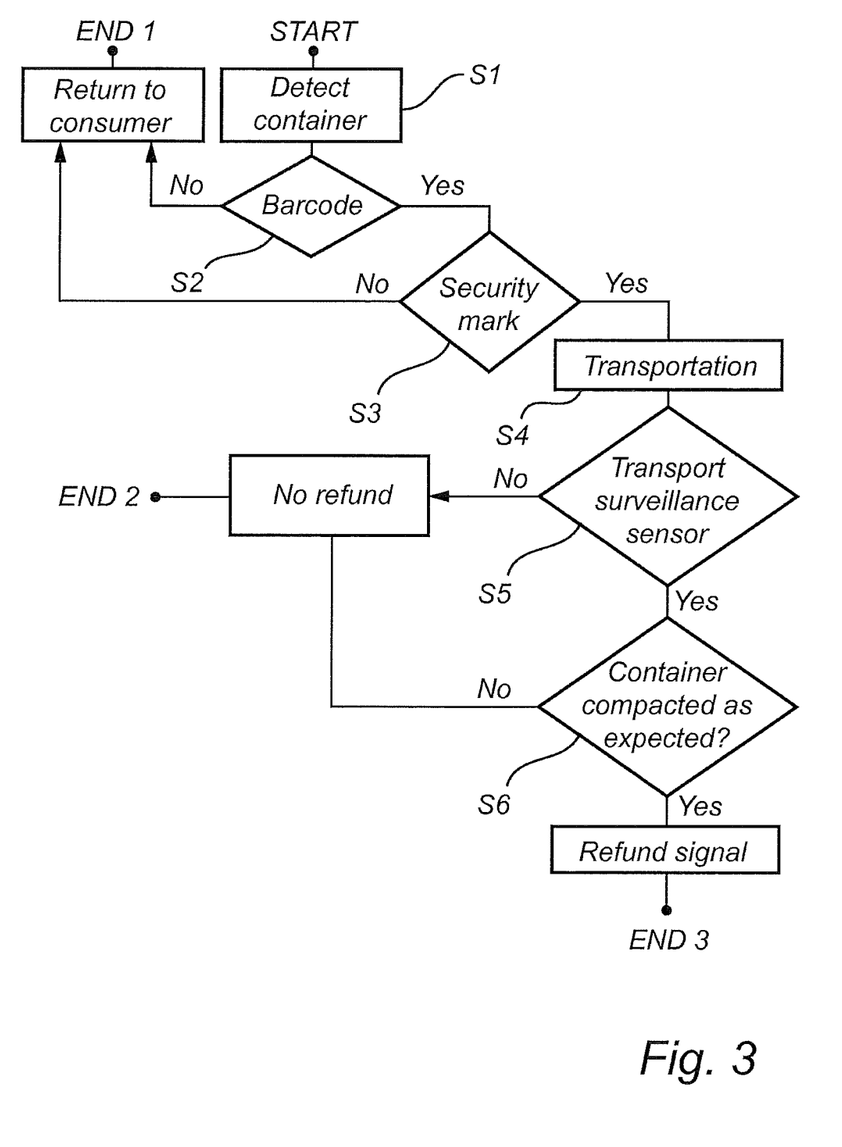
FIG. 3 is a flowchart of a fraud detection method for an individual container according to an embodiment of the present invention.

FIG. 3 is a flowchart of a fraud detection method for an individual container 18. At S1, the detector 14 detects the container 18 in the recognition chamber 16 of the reverse vending machine 12. At S2, the system 10 may check whether the barcode on the container 18 is found and accepted. If no, the container 18 is returned to the consumer that entered the container 18 into the reverse vending machine 12. If yes, the system 10 may further check whether a security mark on the container 18 is found and accepted (S3). If no, the container 18 is returned to the consumer. If yes, the container 18 is transported (S4) by the conveyor or sorter unit 22 towards its designated destination 26a or 26b. At S5, the system 10 may check whether the transport surveillance sensor 20 is triggered as expected, i.e. that container 18 is properly transported or sorted by unit 22. If no, no refund for the container 18 is recorded. If yes, the compactor load sensor monitoring device 30 determines whether the container 18 is compacted as expected e.g. by comparing the load measured by the compactor load sensor 28 with the expected load for the container 18 (S6). If yes (measured and expected loads match), then a refund signal for container 18 may be issued. If no (measured and expected loads do not match), no refund for the container 18 is recorded. Overall, the container 18 has to pass four checkpoints (S2, S3, S5, S6) before it is approved, i.e. before a refund is paid out for the container 18. In other embodiments, any of the checkpoints S2, S3, S5 may be omitted.

Figure 4:
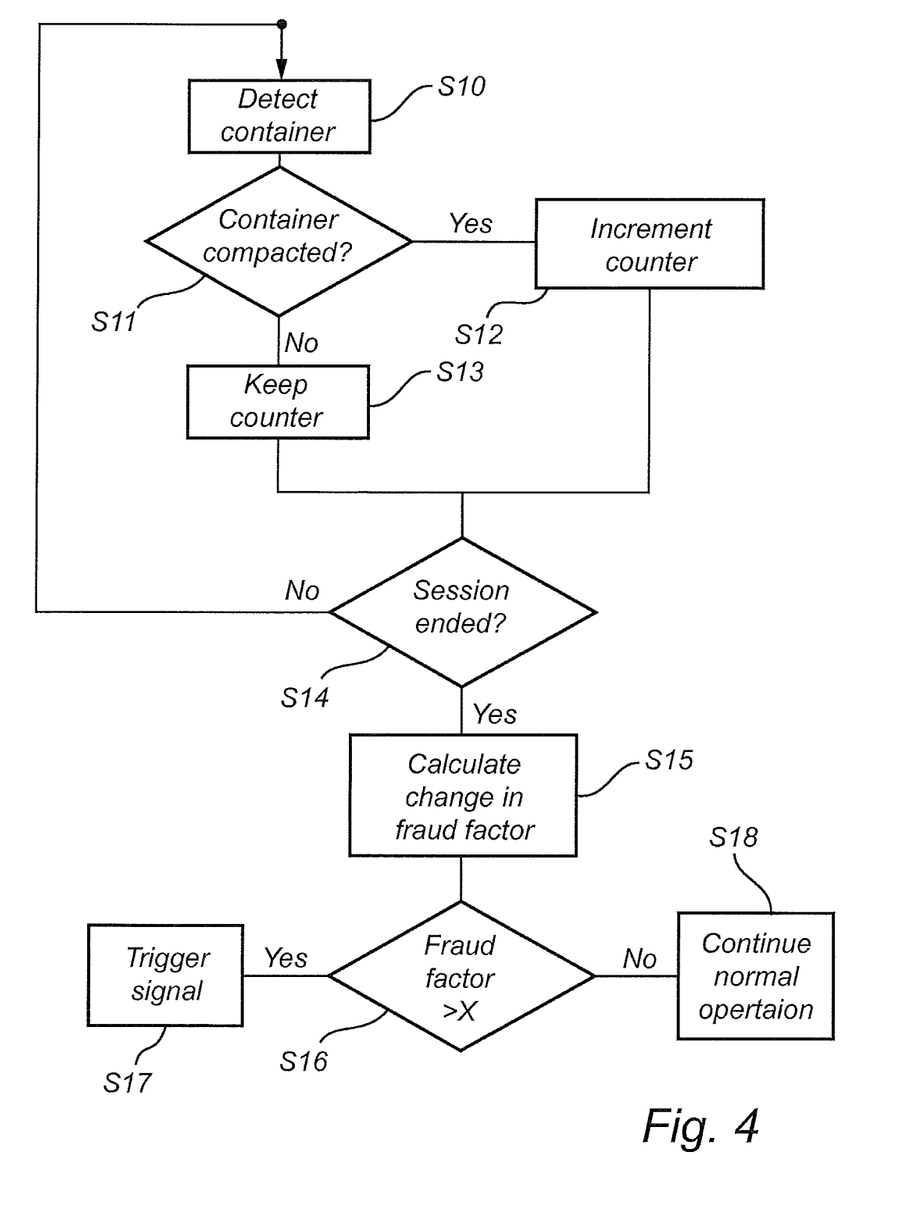
FIG. 4 is a flowchart of a session-based fraud detection method according to an embodiment of the present invention.

FIG. 4 is a flowchart of a session-based fraud detection method according to an embodiment of the invention. At S10, the detector 14 detects a container 18 in the recognition chamber 16 of the reverse vending machine 12. At, S11 the compactor load sensor monitoring device 30 determines whether any container is compacted. If yes, a counter is incremented accordingly (S12). If no, the counter is not incremented (S13). Then, the system 10 checks if the session has ended (S14). If no, another container 18 is detected at S10, and so on. If yes, the compactor load sensor monitoring device 30 calculates the change in fraud factor based on the counter and the number of containers 18 detected by the detector 14 (S15). Then, the system 10 checks if the fraud factor exceeds the threshold X (S16). If yes, the trigger signal is issued (S17). If no, operation of the reverse vending machine 12 continues as normal (S18).

Figure 5:
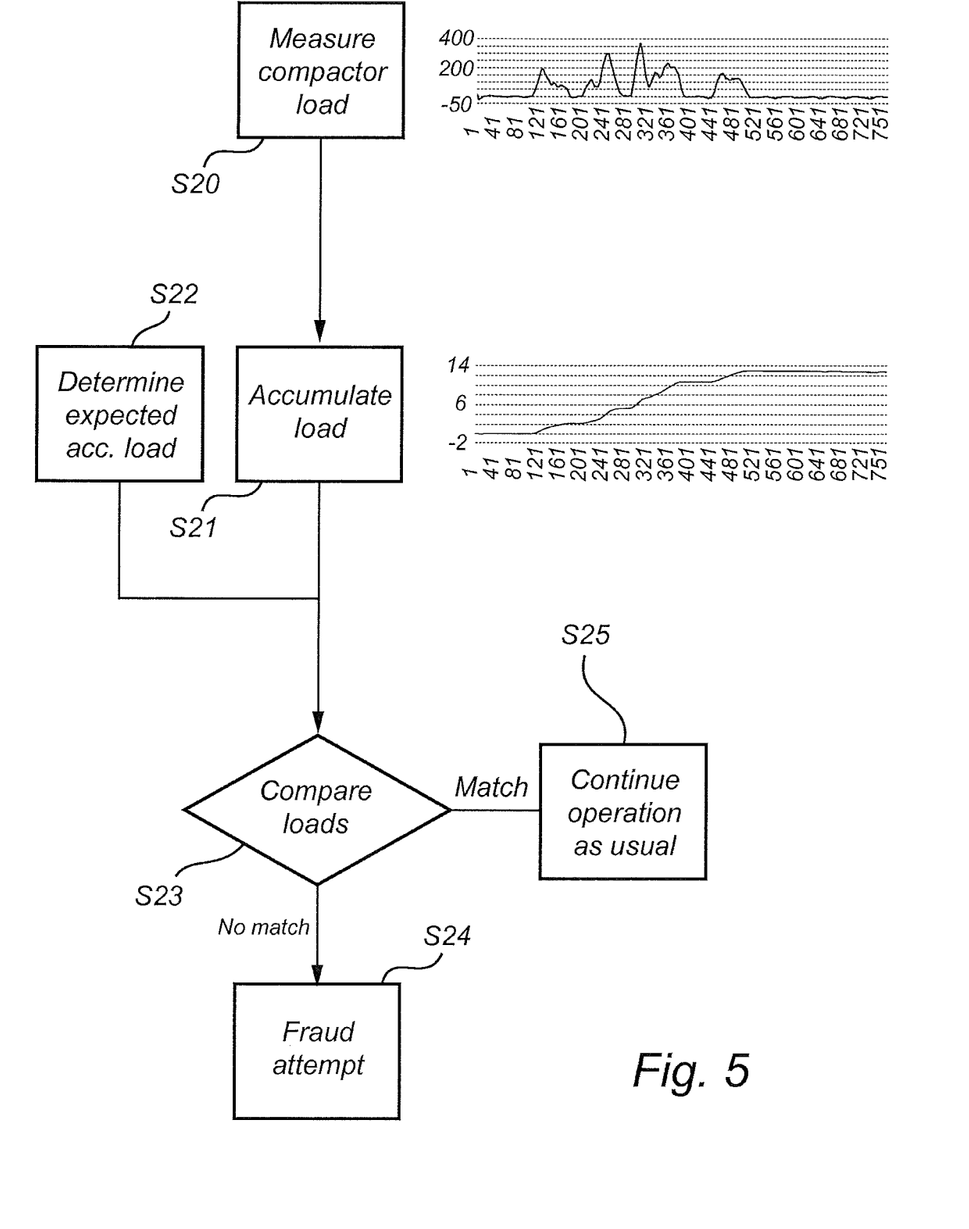
FIG. 5 is a flowchart of a session-based fraud detection method according to another embodiment of the present invention.

FIG. 5 is a flowchart of a session-based fraud detection method according to another embodiment of the invention. At S20, the compactor load sensor 28 measures the load of the compactor 24 during the session. The graph to the right of S20 shows measured load over time. At S21, the compactor load sensor monitoring device 30 accumulates the load measured by the compactor load sensor 28. The graph to the right of S21 shows accumulated load over time. At S22, the system 10 determines an expected accumulated load for the session. Namely, the detector 14 detects what containers that are entered into the reverse vending machine 12 during the session, and based on predetermined or learned compactor loads for the various containers, the expected accumulated load is determined. Then, at S23, the accumulated load from S21 is compared with the expected load from S22. If the loads do not match, then a suspected fraud attempt is indicated (S24). If they do match, operation of the reverse vending machine 12 may continue as usual.

Figure 6:
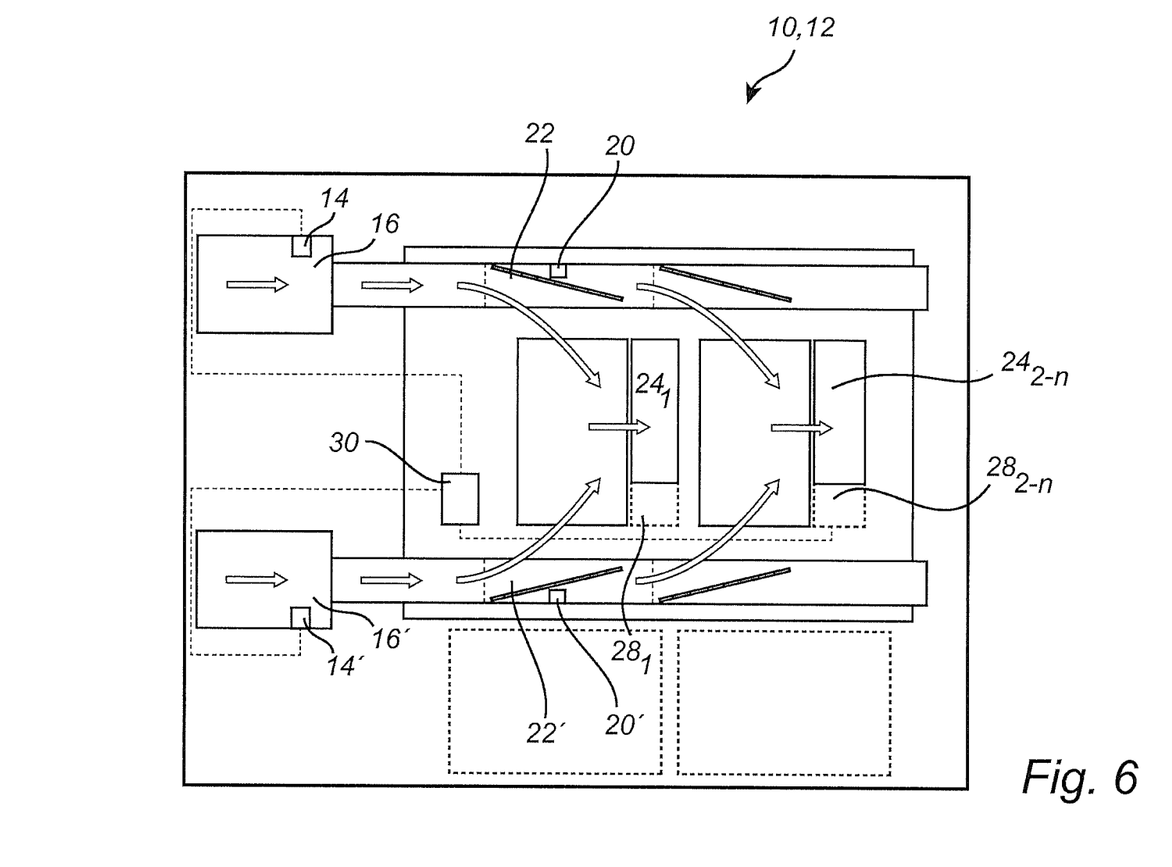
FIG. 6 schematically illustrates a reverse vending machine comprising a fraud detection system according to another embodiment of the present invention.

FIG. 6 shows a reverse vending machine 12 comprising a fraud detection system 10 according to another embodiment of the present invention. The reverse vending machine 12 of FIG. 6 is similar to that of FIG. 1, except that it comprises dual detectors 14, 14' and recognition chambers 16, 16', and dual transport surveillance sensors 20, 20' and conveyor or sorter units 22, 22'. The system may further comprise at least two compactors $24_1$, $24_{2-n}$ and at least two compactor load sensors $28_1$, $28_{2-n}$. A common compactor load sensor monitoring device 30 may be used and handle all compactors $24_{1-n}$. Alternatively, the system may comprise one compactor load sensor monitoring device per compactor/compactor load sensor.

According to one or more embodiments of the present invention, the compactor load sensor monitoring device 30 may be configured to determine an expected compaction time window 36 (see FIG. 7b) for a container 18 based on the moment the container 18 is detected by the detector 14. In other words, the expected compaction time window 36 is defined relative to the point in time when the container 18 was observed by the detector 14. The expected compaction time window 36 may be a time range having a predetermined duration or length, and the expected compaction time window 36 may start or occur a predetermined time after the moment the container 18 is detected by the detector 14, depending on the layout of the reverse vending machine 12.

Figure 7A:
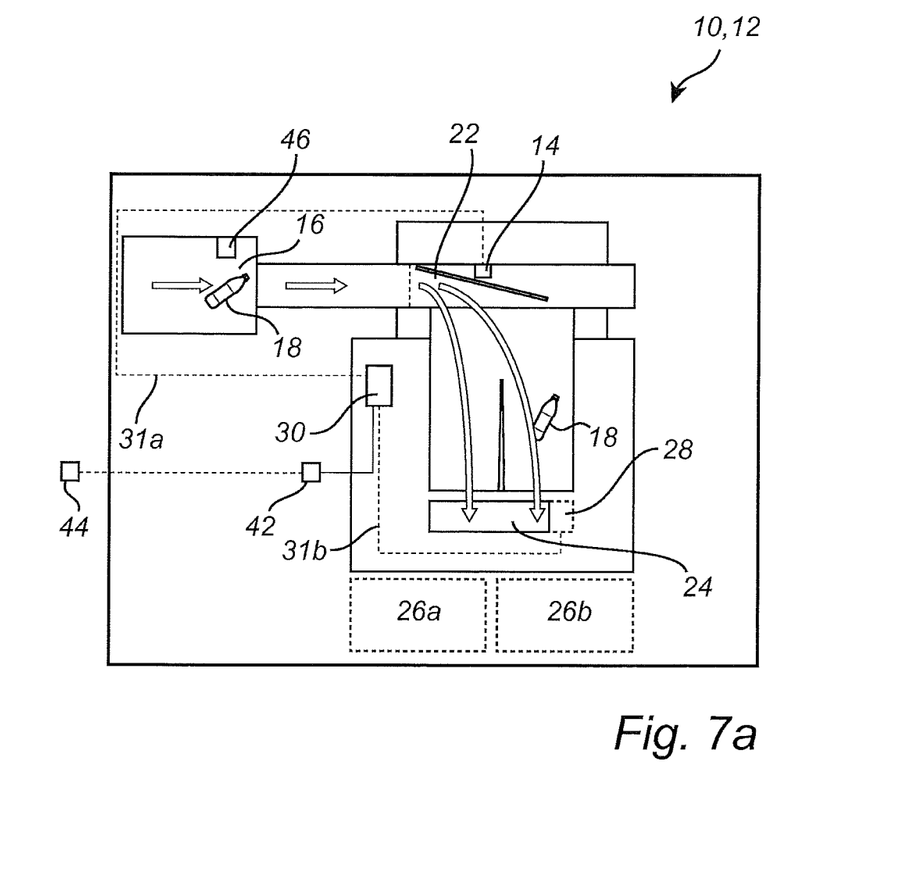
FIGS. 7a-c illustrate one or more embodiments of the present invention.

The detector 14 may here be adapted to detect the container 18 in conjunction with the sorter unit 22 (see FIG. 7a), or in conjunction with the last sorter unit before the compactor 24 if there is more than one sorter unit.

Figure 7B:
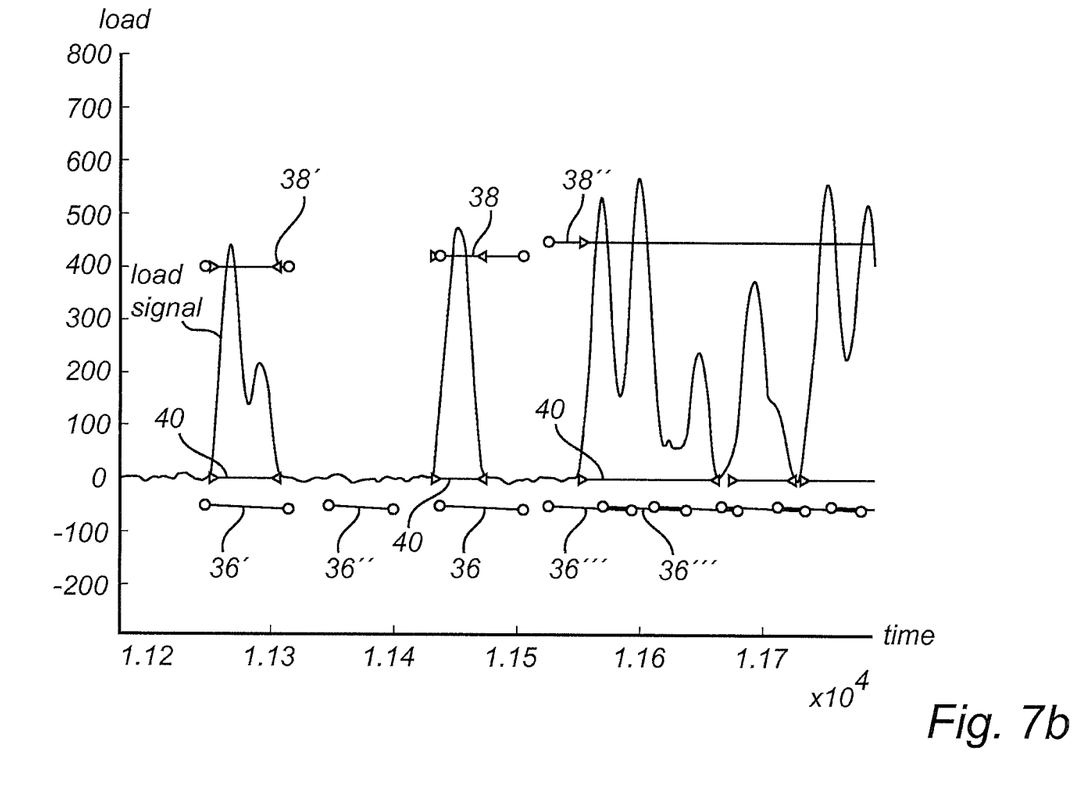

The compactor load sensor monitoring device 30 may further be configured to construct a compaction event, as schematically indicated by reference sign 38. The compaction event 38 may include the expected compaction time window 36 for at least one container 18 and corresponding load data representative of the load of the compactor 24 measured by the compactor load sensor 28. The load data may include at least one of the time 40 that the measured load exceeds a predetermined value, the peak of the measured load, and the integral of the measured load for that time. The predetermined value may be the idle load of the compactor 28 when no container is compacted plus an offset. In FIG. 7b, the predetermined value is set to 50 on the vertical axis.

For a container 18 compacted alone, the compaction event 38' includes the expected compaction time window and the load data for that container. For containers 18 compacted more or less together, wherein their expected compaction time windows 36 overlap, the compaction event 38" may include the expected compaction time windows and the load data for all those containers.

The compaction event 38 may include additional information, such as at least one of material (ALU, FE, PET, GLASS, etc.), empty weight (e.g. in grams) and volume (e.g. in millilitre) of the container(s) 18. Such additional information may be looked up in a database based on the barcode of the container(s) 18 read by a barcode reader 46 of the system 10, for example.

The system 10 may further comprise communication means 42 adapted to send constructed compactions events 38 to a remote device 44, for example for data visualization and/or offline analysis. Offline analysis may include analyzing constructed compactions events from each machine 12 across several days/weeks and look for significant changes in behaviour, and/or to look for significant long time difference between similar machines. The constructed compactions events 38 can for example be sent to the remote device 44 once a day.

The compactor load sensor monitoring device 30 may further be configured to determine that a detected container 18 is not compacted as expected if the measured load in the corresponding expected compaction time window 36 does not exceed the predetermined value, for example if there is no measured load in the expected compaction time window, like in expected compaction time window 36" in FIG. 7b. Contrary, in expected compaction time window 36', where the measured load exceeds the predetermined value, the compactor load sensor monitoring device 30 may determine that an item, presumably the corresponding container 18, was compacted. In this way, the compactor load sensor monitoring device 30 may determine for each constructed compaction event the percentage of non-compacted containers ("stray items") per detected container(s) 18. In the expected compaction time window 36', this percentage is 0/1=0%. In the expected compaction time window 36", the percentage is 1/1=100%. In the expected compaction time windows 36'" (constructed compaction event 38"'), the percentage is 0/5=0%. A moving average of the share of non-compacted containers for a number (e.g. 50) of the last detected containers 18 can be calculated by the compactor load sensor monitoring device 30. This moving average may be compared to a predetermined maximum value (amount of non-compacted containers). The moving average may be used to calculate and/or update a fraud factor. The moving average can be an exponential moving average.

It may be appreciated that the function described in the previous paragraph can determine that something was compacted in the expected compaction time window, but it cannot be completely sure that the item that was compacted actually was the same container that was detected. To this end, the compactor load sensor monitoring device 30 may further be configured to normalize the measured load for at least one detected container 18, by dividing it with the empty weight of the at least one container 18 as indicated in the aforementioned additional information. The normalized measured load may be expressed as lag per gram, wherein lag' is a delay of the compactor 28 caused by compaction and hence representative of the load of the compactor 28. The compactor load sensor monitoring device 30 may further be configured to calculate a moving average based on the normalized measured load for the at least one container 18 and on normalized measured load for one or more previous containers. The moving average may be an exponential moving average, and the one or more previous containers may be 10, 50 or 100 previous containers, for example. The compactor load sensor monitoring device 30 may further be configured to determine that containers 18 generally are compacted as expected if the calculated moving average matches (within predetermined margins) an expected, predetermined average. If the calculated moving average does not match the expected predetermined average, some of the containers 18 were not compacted as expected (removed or replaced), whereby a fraud attempt may exist. This may be used to calculate and/or update a fraud factor.

In operation (FIG. 7c), the expected compaction time window 36 for a container 18 is determined in step S1. In step S2, load of the compactor 24 is measured. In step S3, the aforementioned additional data, including container empty weight, are retrieved.

Figure 7C:
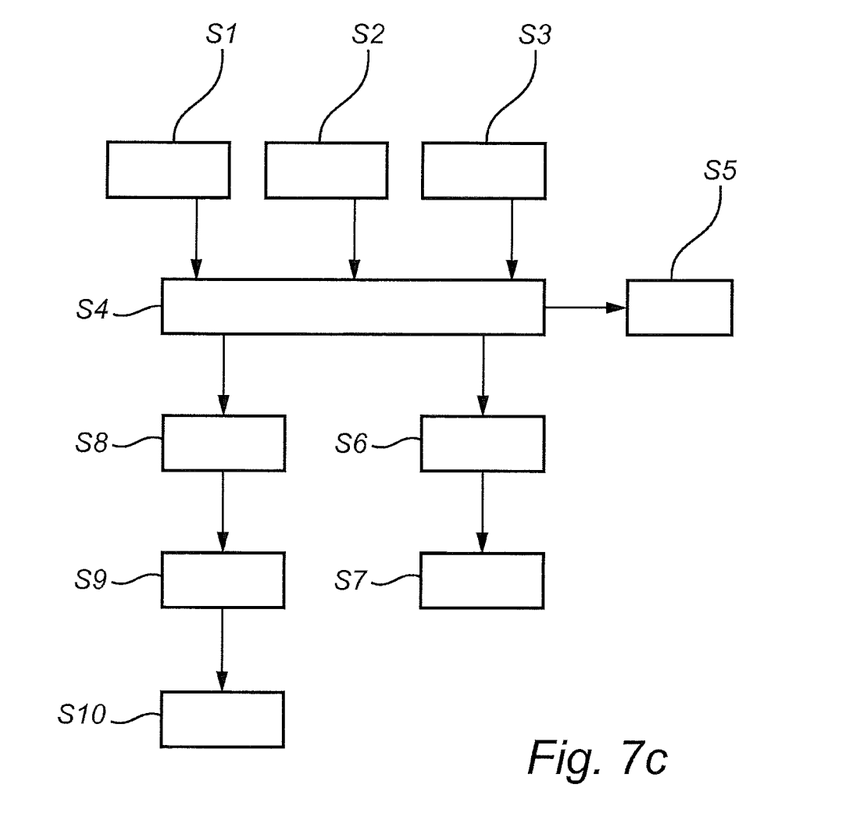

In step S4, the compaction event 38 is contructed, based on the expected compaction time window 36, the load, and the additional data. In step S5, constructed compacting events 38 may be sent to the remote device 44.

In step S6, it is determined that a container is not compacted as expected if the measured load in the expected compaction time window does not exceed a predetermined value, whereby the share of detected containers 18 that are not compacted may be determined. In step S7, the moving average of the share of non-compacted containers is calculated.

In step S8, the measured load for one or more containers 18 is normalized. In step S9, a moving average of normalized measured loads is calculated. In step S10, the calculated moving average is compared to a predetermined, expected average.

The person skilled in the art realizes that the present invention by no means is limited to the embodiment(s) described above. On the contrary, many modifications and variations are possible within the scope of the appended claims.

The invention claimed is:

1. A fraud detection method in a reverse vending machine, which method comprises:
   detecting, by a detector, at least one container entered into the reverse vending machine;
   determining, by a compactor load sensor monitoring device, an expected compaction time window for a container of the at least one container based on the moment the container is detected by the detector;
   measuring, by a compactor load sensor, a load of a compactor intended to compact entered containers; and
   determining, by the compactor load sensor monitoring device, whether the detected at least one container is compacted as expected based on the load measured by the compactor load sensor.

2. A fraud detection system for a reverse vending machine, the system comprising:
   a detector adapted to detect at least one container entered into the reverse vending machine;
   a compactor load sensor adapted to measure load of a compactor of the reverse vending machine during operation, wherein the compactor is adapted to compact entered containers downstream of said detector; and a compactor load sensor monitoring device configured to determine:
- an expected compaction time window for a container of the at least one container based on the moment the container is detected by the detector; and
- whether the detected at least one container is compacted as expected based on the load measured by the compactor load sensor.

3. A fraud detection system according to claim 2, wherein the compactor load sensor monitoring device is configured to determine whether an individual detected container is compacted as expected by comparing the load measured by the compactor load sensor with an expected compactor load for the detected container.

4. A fraud detection system according to claim 3, wherein the expected load is expected to occur within a predetermined time range following detection of the container by the detector.

5. A fraud detection system according to claim 2, wherein the compactor load sensor monitoring device is configured to determine the number of compacted containers for a session of the reverse vending machine, and to calculate a change in fraud factor based on the number of compacted containers and a number of containers detected by the detector for said session.

6. A fraud detection system according to claim 5, wherein a trigger signal is issued if the fraud factor exceeds a threshold.

7. A fraud detection system according to claim 5, the compactor load sensor monitoring device is configured to increase the fraud factor with a greater amount, A, for each container which is not compacted as expected and to decrease the fraud factor with a smaller amount, B, for each container that is compacted as expected.

8. A fraud detection system according to claim 2, wherein the compactor load sensor monitoring device is configured to determine whether a plurality of detected containers are compacted as expected by accumulating the load measured by the compactor load sensor for a session of the reverse vending machine.

9. A fraud detection system according to claim 2, wherein said detector is selected form a group comprising: a barcode reader, a security mark reader, a shape sensor, and a material sensor.

10. A fraud detection system according to claim 2, further comprising a transport surveillance sensor arranged downstream of said detector and upstream of said compactor load sensor.

11. A fraud detection system according to claim 9, wherein a refund signal is issued only if each of the detector, the transport surveillance sensor, and the compactor load sensor has indicated proper handling of the container.

12. A fraud detection system according to claim 2, wherein the compactor load sensor monitoring device is configured to analyse a compactor load profile of the load measured by the compactor load sensor to classify the at least one container.

13. A fraud detection system according to claim 12, wherein the compactor load sensor monitoring device is configured to record compactor load profiles for various containers, and wherein the system further comprises machine learning software configured to train the system based on the recorded compactor load profiles.

14. A fraud detection system according to claim 2, wherein the detector is adapted to send further information about the at least one detected container to the compactor load sensor monitoring device.

15. A fraud detection system according to claim 2, wherein said compactor load sensor includes a tacho sensor in a power train of the compactor.

16. A fraud detection system according to claim 2, further comprising a second compactor and a second compactor load sensor adapted to measure load of the second compactor during operation.

17. A fraud detection system according to claim 2, wherein the compactor load sensor monitoring device is configured to construct a compaction event including the expected compaction time window for at least one container and corresponding load data representative of the load of the compactor measured by the compactor load sensor.

18. A fraud detection system according to claim 17, further comprising communication means adapted to send constructed compactions events to a remote device.

19. A fraud detection system according to claim 2, wherein the compactor load sensor monitoring device is configured to determine that the container is not compacted as expected if the measured load in the expected compaction time window does not exceed a predetermined value.

20. A fraud detection system according to claim 2, wherein the compactor load sensor monitoring device is configured to normalize the measured load for the at least one container, and to calculate a moving average based on the normalized measured load for said at least one container and normalized measured load for one or more previous containers.

21. A fraud detection system according to claim 20, wherein the compactor load sensor monitoring device is configured to determine that containers are compacted as expected if the calculated moving average matches an expected, predetermined average.

22. A fraud detection system according to claim 20 wherein the compactor load sensor monitoring device is configured to normalize the measured load for the at least one container by dividing it with the empty weight of the at least one container.

23. A reverse vending machine comprising a fraud detection system according to claim 2.

* * * * *